United States Patent
Ketzner

(10) Patent No.: US 10,959,004 B2
(45) Date of Patent: Mar. 23, 2021

(54) HEADSET ATTACHMENT

(71) Applicant: Nicholas Ketzner, Bird City, KS (US)

(72) Inventor: Nicholas Ketzner, Bird City, KS (US)

(*) Notice: Subject to any disclaimer, the term of this patent is extended or adjusted under 35 U.S.C. 154(b) by 0 days.

(21) Appl. No.: 16/451,120

(22) Filed: Jun. 25, 2019

(65) Prior Publication Data

US 2019/0313175 A1 Oct. 10, 2019

Related U.S. Application Data

(60) Provisional application No. 62/690,469, filed on Jun. 27, 2018.

(51) Int. Cl.
*H04R 1/08* (2006.01)
*H04R 1/10* (2006.01)
*H04B 1/3827* (2015.01)
*H04R 5/033* (2006.01)

(52) U.S. Cl.
CPC ............ *H04R 1/083* (2013.01); *H04B 1/385* (2013.01); *H04R 1/105* (2013.01); *H04R 1/1008* (2013.01); *H04R 1/1066* (2013.01); *H04R 1/1091* (2013.01); *H04R 5/0335* (2013.01); *H04B 2001/3866* (2013.01)

(58) Field of Classification Search
CPC ........ H04R 1/086; H04R 1/305; H04R 1/385; H04R 1/1008; H04R 1/1091; H04R 5/033; H04R 5/0335; H04R 19/04
See application file for complete search history.

(56) References Cited

U.S. PATENT DOCUMENTS

| | | |
|---|---|---|
| 2003/0000001 A1* | 1/2003 | McDonald ............... A62B 7/14 2/6.3 |
| 2008/0304690 A1 | 12/2008 | Poindexter |
| 2010/0022281 A1 | 1/2010 | Cohen et al. |
| 2013/0174381 A1 | 7/2013 | McClellan |
| 2016/0255432 A1 | 9/2016 | Villareal |
| 2016/0293065 A1 | 10/2016 | Cunningham |

* cited by examiner

*Primary Examiner* — Sunita Joshi

(74) *Attorney, Agent, or Firm* — Boudwin Intellectual Property; Daniel Boudwin

(57) ABSTRACT

A headset attachment. The headset attachment is removably connectable to a headset and includes means to conceal a mouth of an individual wearing the headset. The headset attachment includes a pair of members each pivotably attached to a hinge. A cover is connected to each member of the pair of members. The cover is configured to transition between an expanded configuration and a retracted configuration. In the expanded configuration, the cover conceals the mouth of the individual, and in the retracted configuration, the cover does not conceal the mouth of the individual. The headset attachment is useful for selectively concealing a mouth of an individual to prevent a third party from lip-reading or eavesdropping.

11 Claims, 4 Drawing Sheets

HEADSET ATTACHMENT

CROSS REFERENCE TO RELATED APPLICATIONS

This application claims priority under 35 U.S.C. § 119(e) to U.S. Provisional Application No. 62/690,469 filed on Jun. 27, 2018. The above identified patent application is incorporated by reference herein in its entirety to provide continuity of disclosure.

BACKGROUND OF THE INVENTION

The present invention relates to a headset attachment for selectively concealing a mouth of an individual wearing a headset.

Many individuals use headsets with microphones to communicate. In some situations, it may be desirable to prevent lip-reading or eavesdropping by a third party. Such situations include professional sporting events, during which coaches, trainers, directors, coordinators, and other professionals may speak into headset microphones to discuss private or sensitive information, such as game strategies, plans, and the like. Existing solutions to prevent lip-reading or eavesdropping by covering a mouth of such an individual may interfere with face-to-face communication, and the individual wearing a headset having such a solution attached thereto may need to perform complicated and time-consuming actions to improve clarity of face-to-face communication, such as removing the headset or removing the solution from the headset. These actions waste valuable time that could otherwise be spent communicating strategies.

Therefore, there is a need in the art for a headset attachment for selectively concealing a mouth of an individual wearing a headset. The present invention addresses this unmet need.

Devices have been disclosed in the art that relate to preventing lip-reading of an individual communicating with a headset. These include devices that have been patented and published in patent application publications. These devices are often complicated and time-consuming to use. In view of the devices disclosed in the art, it is submitted that there is a need in the art for an improvement to existing headset attachments. In view of the present disclosure, it is submitted that the present invention substantially diverges in structural and functional elements from devices in the art, and substantially fulfills an unmet need in the art.

SUMMARY OF THE INVENTION

In view of the disadvantages inherent in the known types of headset attachments in the art, the present invention provides a new and improved headset attachment, wherein the same can be utilized for preventing lip-reading of an individual wearing and communicating with a headset.

It is therefore an object of the present invention to provide a headset attachment for preventing lip-reading of an individual communicating with and wearing the headset.

In one aspect, the invention provides a headset attachment comprising a cover configured to transition between an expanded configuration and a retracted configuration.

In another aspect, the invention provides a headset attachment comprising a cover configured to transition between an expanded configuration and a retracted configuration, an upper member connected to an upper portion of the cover, and a lower member connected to a lower portion of the cover. A first movement transitions the cover from the retracted configuration to the expanded configuration, and a second movement transitions the cover from the expanded configuration to the retracted configuration. Generally, the first movement and the second movement each includes movement of one or more of the members.

Another object of the present invention is to provide a headset attachment that may be readily manufactured from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of the invention will be particularly pointed out in the claims, the invention itself and manners in which it may be made and used may be better understood after a review of the following description, taken in connection with the accompanying drawings, wherein like numeral annotations are provided throughout.

DETAILED DESCRIPTION OF THE INVENTION

Figure 1A:
FIG. 1A depicts a front perspective view of an exemplary headset attachment in a retracted configuration, attached to a headset and in use by an individual.

Reference is made herein to the attached drawings. Like reference numerals are used throughout the drawings to depict like or similar elements of the invention. The figures are intended for representative purposes only and should not be considered limiting in any respect.

Reference is now made to the drawings, which depict one or more exemplary embodiments of the invention.

Figure 1B:
FIG. 1B depicts a front perspective view of the exemplary headset attachment in an expanded configuration, attached to the headset and in use by the individual.

Referring now to FIGS. 1A and 1B, there are depicted front perspective views of an exemplary headset attachment in a retracted and expanded configuration, respectively, attached to a headset and in use by an individual. A headset attachment 1, depicted attached to a headset 2, includes a cover configured to transition between an expanded configuration (FIG. 1B) and a retracted configuration (FIG. 1A). In the expanded position, the cover conceals a mouth of an individual, and in the retracted position, the cover does not conceal the mouth of the individual. In this manner, the headset attachment 1 is useful for selectively concealing the mouth of the individual to prevent a third party from lip-reading or eavesdropping.

Figure 2A:
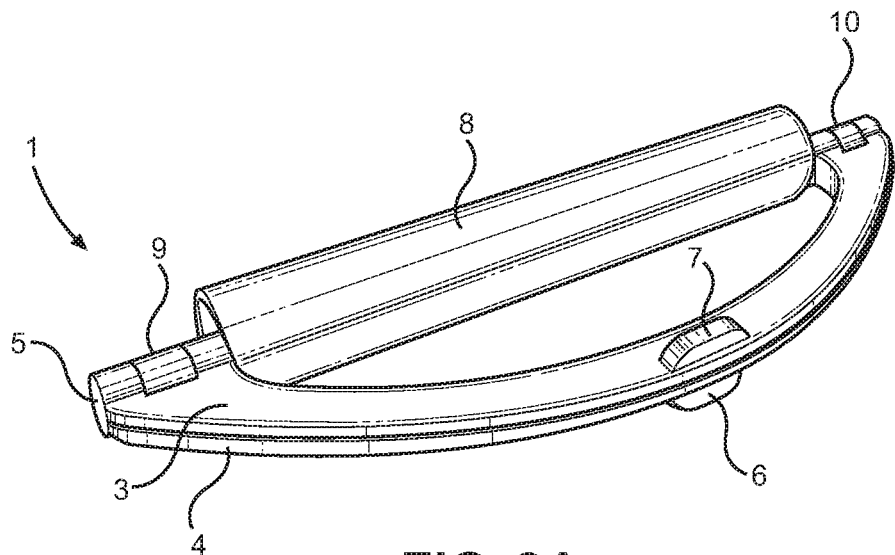
FIG. 2A depicts a perspective view of the exemplary headset attachment in the retracted configuration.
Figure 2B:
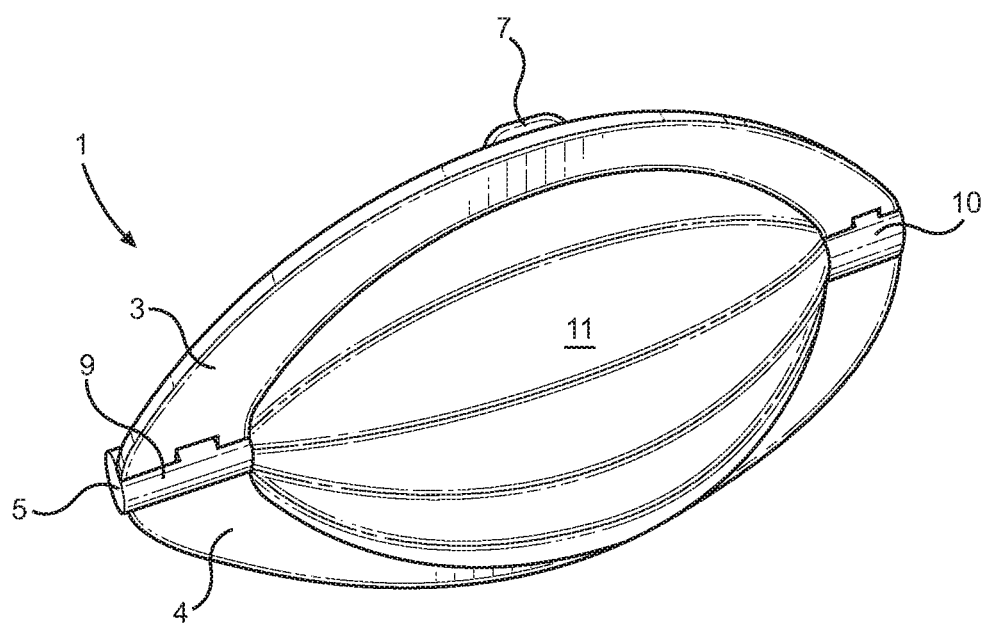
FIG. 2B depicts a perspective view of the exemplary headset attachment in the expanded configuration.

Referring now to FIGS. 2A and 2B, there are depicted front perspective views of the exemplary headset attachment in a retracted and expanded configuration, respectively. In the shown embodiment, a cover 11 is connected to one or more members (3, 4). A first movement of one or more of the one or more members (3, 4) transitions the cover 11 from the retracted configuration (FIG. 2A) to the expanded configuration (FIG. 2B), and a second movement of one or more of the one or more members (3, 4) transitions the cover 11 from the expanded configuration (FIG. 2B) to the retracted configuration (FIG. 2A). In this manner, the individual using the exemplary headset attachment can configure the headset attachment 1 without need for removal of the headset attachment 1.

In the shown embodiment, the first movement increases a distance between a first member 3 of the one or more members and a second member 4 of the one or more members, and the second movement decreases the distance between the first member 3 and the second member 4. In the shown embodiment, the first member 3 is an upper member, and the second member 4 is a lower member. In the shown embodiment, the upper member 3 and the lower member 4 are each pivotally attached to a hinge (5, 9, 10). In the shown embodiment, the upper member 3 includes a finger grip 7 thereon and the lower member 4 includes a finger grip 6 thereon; in this manner, the upper member 3 and the lower member 4 may easily be opened and closed during and after use, respectively.

Figure 3A:
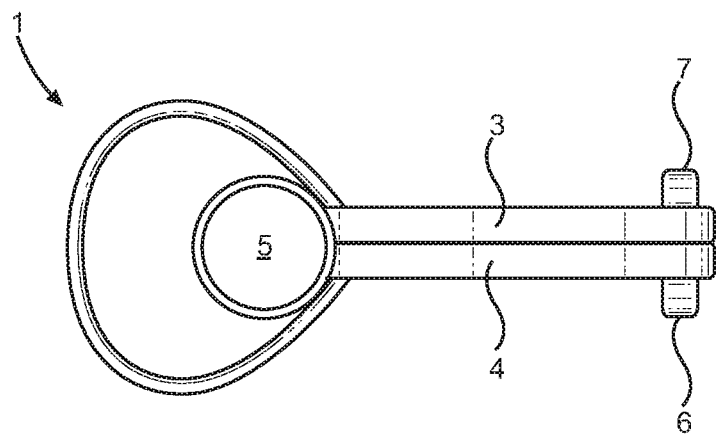
FIG. 3A depicts a side view of the exemplary headset attachment in the retracted configuration.
Figure 3B:
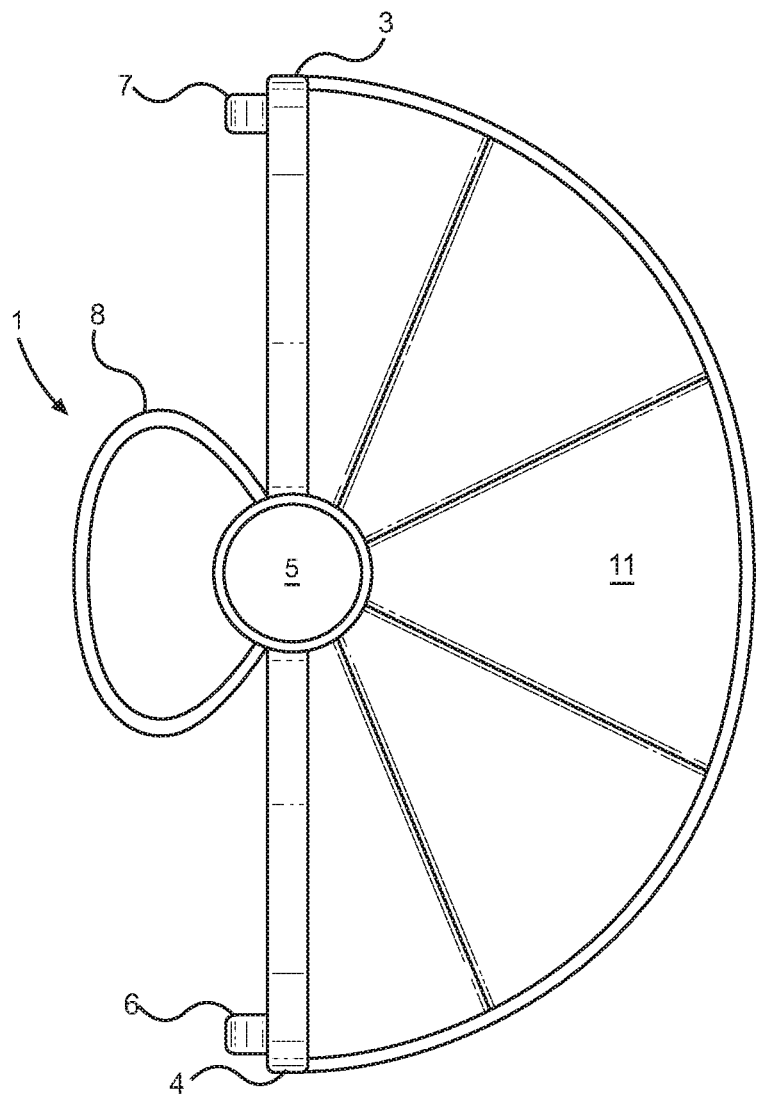
FIG. 3B depicts a side view of the exemplary headset attachment in the expanded configuration.

Referring now to FIGS. 3A and 3B, there are depicted side perspective views of the exemplary headset attachment in the retracted and expanded configuration, respectively. As described for FIGS. 2A and 2B, the headset attachment 1 includes the cover 11, which is expandable and retractable. In the shown embodiment, the cover 11 is connected to the upper member 3 and the lower member 4. The first movement of one or more of the one or more members (3, 4) transitions the cover 11 from the retracted configuration (FIG. 3A) to the expanded configuration (FIG. 3B), and the second movement of one or more of the one or more members (3, 4) transitions the cover 11 from the expanded configuration (FIG. 3B) to the retracted configuration (FIG. 3A). In this manner, the individual using the exemplary headset attachment can configure the headset attachment 1 without need for removal of the headset attachment 1.

In the shown embodiment, the first movement increases the distance between the upper member 3 and the lower member 4, and the second movement decreases the distance. In the shown embodiment, the upper member 3 and the lower member 4 are each pivotally attached to a hinge (5, 9, 10). In the shown embodiment, the upper member 3 includes the finger grip 7 thereon and the lower member 4 includes the finger grip 6 thereon; in this manner, the upper member 3 and the lower member 4 may easily be opened and closed during and after use, respectively. Further, in the shown embodiment, the hinge (5, 9, 10) may be biased by a rear member 8, which may provide a force to keep the cover in the retracted configuration. The force provided by the rear member 8 may be overcome by applying an upward force on the upper member 3 (e.g., by pulling upward on the finger grip 7) and/or a downward force on the lower member 4 (e.g., by pulling downward on the finger grip 6). In addition, the headset attachment 1 may include a release mechanism to allow the bias of the rear member 8 to place the headset attachment in the retracted configuration, for convenience to the individual using the headset attachment 1 in the event that they no longer need to conceal their mouth.

Figure 4B:
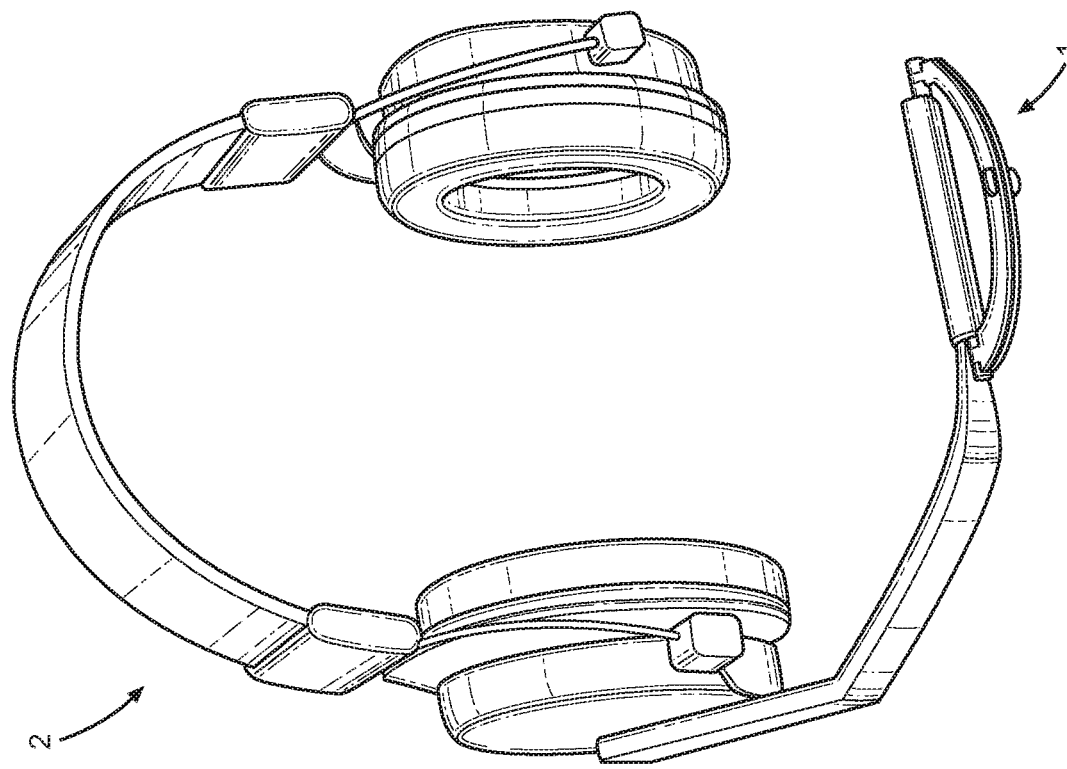
FIG. 4B depicts a perspective view of the exemplary headset attachment, attached to the headset.
Figure 4A:
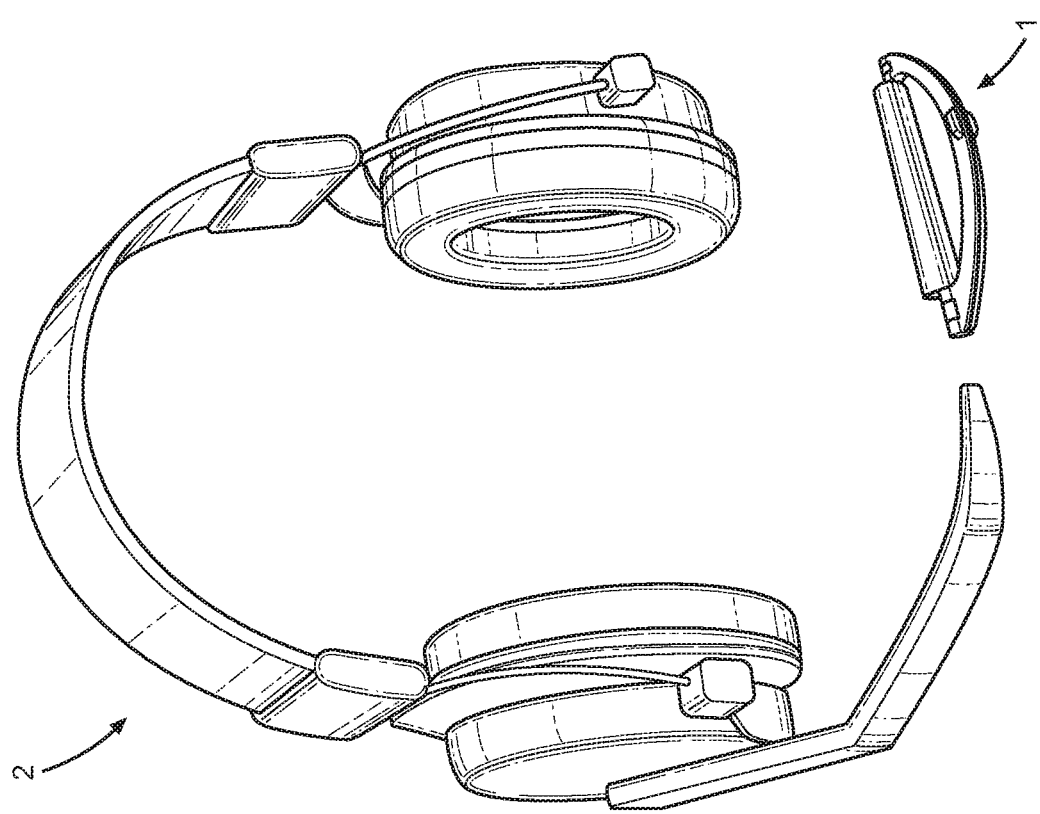
FIG. 4A depicts a perspective view of the exemplary headset attachment, adjacent and unattached to the headset.

Referring now to FIGS. 4A and 4B, there are depicted perspective views of the headset attachment, unattached (FIG. 4A) and attached (FIG. 4B) to the headset. The headset attachment 1 may include any means, such as a friction fit, a snap fit, or otherwise, for attaching to the headset 2. In the shown embodiment, the headset attachment 1 is reversibly attachable to the headset 2. In alternate embodiments, the headset attachment 1 is permanently or semi-permanently attached to the headset 2.

The foregoing descriptions of specific embodiments of the present invention have been presented for purposes of illustration and description. They are not intended to be exhaustive or to limit the present invention to the precise forms disclosed, and modifications and variations are possible in view of the above teaching. The exemplary embodiment was chosen and described to best explain the principles of the present invention and its practical application, to thereby enable others skilled in the art to best utilize the present invention and its embodiments with modifications as suited to the use contemplated.

It is therefore submitted that the present invention has been shown and described in the most practical and exemplary embodiments. It should be recognized that departures may be made which fall within the scope of the invention. With respect to the description provided herein, it is submitted that the optimal features of the invention include variations in size, materials, shape, form, function and manner of operation, assembly, and use. All structures, functions, and relationships equivalent or essentially equivalent to those disclosed are intended to be encompassed by the present invention.

I claim:

1. A headset attachment, comprising:
   a cover configured to transition between an expanded configuration and a retracted configuration;
   wherein the cover is connected to one or more members;
   wherein a first movement of one or more of the one or more members transitions the cover from the retracted configuration to the expanded configuration;
   wherein a second movement of one or more of the one or more members transitions the cover from the expanded configuration to the retracted configuration;
   wherein the cover is connected to an upper member and a lower member;
   wherein a first movement transitions the cover from the retracted configuration to the expanded configuration;
   wherein a second movement transitions the cover from the expanded configuration to the retracted configuration;
   wherein the first movement includes movement of one or more members selected from a group consisting of: the upper member, and the lower member;
   wherein the second movement includes movement of one or more members selected from the group;
   wherein one or more members selected from the group is pivotably attached to a hinge.

2. The headset attachment of claim 1, wherein the headset attachment is reversibly attachable to a headset.

3. The headset attachment of claim 1, wherein the first movement increases a distance between a first member of the one or more members and a second member of the one or more members;
   wherein the second movement decreases the distance between the first member and the second member.

4. The headset attachment of claim 1, wherein the upper member and the lower member are each pivotally attached to the hinge.

5. A headset attachment comprising:
   a cover configured to transition between an expanded configuration and a retracted configuration;
   wherein the cover is connected to one or more members;

wherein a first movement of one or more of the one or more members transitions the cover from the retracted configuration to the expanded configuration;

wherein a second movement of one or more of the one or more members transitions the cover from the expanded configuration to the retracted configuration;

wherein the cover is connected to an upper member and a lower member;

wherein a first movement transitions the cover from the retracted configuration to the expanded configuration;

wherein a second movement transitions the cover from the expanded configuration to the retracted configuration;

wherein the first movement includes movement of one or more members selected from a group consisting of: the upper member, and the lower member;

wherein the second movement includes movement of one or more members selected from the group;

wherein if the headset attachment is in the retracted configuration, a distance between the upper member and the lower member is minimized;

wherein if the headset attachment is in the expanded configuration, the distance is maximized.

6. The headset attachment of claim 5, wherein one or more members selected from the group is pivotally attached to a hinge.

7. The headset attachment of claim 6, wherein the upper member and the lower member are each pivotally attached to the hinge.

8. A headset attachment, comprising:
a cover configured to transition between an expanded configuration and a retracted configuration;
an upper member connected to an upper portion of the cover;
a lower member connected to a lower portion of the cover;
wherein a first movement transitions the cover from the retracted configuration to the expanded configuration;
wherein a second movement transitions the cover from the expanded configuration to the retracted configuration;
wherein the first movement includes movement of one or more members selected from a group consisting of: the upper member, and the lower member;
wherein the second movement includes movement of one or more members selected from the group;
wherein one or more members selected from the group is pivotably attached to a hinge.

9. The headset attachment of claim 8, wherein the first movement includes an unfolding of the cover, wherein the second movement includes a folding of the cover.

10. The headset attachment of claim 9, wherein the unfolding includes an increase in a distance between the upper member and the lower member;
wherein the folding includes a decrease in the distance.

11. The headset attachment of claim 8, wherein the upper member and the lower member are each pivotally attached to the hinge.

* * * * *